United States Patent [19]

O'Connell

[11] 3,938,120

[45] Feb. 10, 1976

[54] TALKING DOOR SENTINEL

[75] Inventor: Gerard O'Connell, Holyoke, Mass.

[73] Assignee: Baltimore Brushes, Inc., Boston, Mass.

[22] Filed: May 6, 1974

[21] Appl. No.: 467,297

[52] U.S. Cl. ............. 340/274 R; 340/221; 179/5 P; 200/616

[51] Int. Cl.[2] ................... G08B 13/08; H04M 11/04

[58] Field of Search .................... 340/274, 221, 276; 179/5 P; 200/61.62, 61.93

[56] References Cited

UNITED STATES PATENTS

| | | | |
|---|---|---|---|
| 2,474,757 | 6/1949 | Parilla | 340/221 |
| 3,266,029 | 8/1966 | Callahan | 340/274 |
| 3,378,830 | 4/1968 | Patrick | 340/274 |
| 3,634,846 | 11/1972 | Fogiel | 340/274 |
| 3,755,802 | 8/1973 | Bobrowski | 340/274 |
| 3,798,627 | 3/1974 | Kaufman | 340/274 |
| 3,798,833 | 3/1974 | Campbell | 46/227 |

*Primary Examiner*—John W. Caldwell
*Assistant Examiner*—William M. Wannisky
*Attorney, Agent, or Firm*—Cesari and McKenna

[57] ABSTRACT

A talking door sentinel has a housing which is secured to the edge of a door by means of a bracket. The movement of the door away from the door frame upon its being opened, moves a trigger which actuates a battery-operated voice box inside the housing. The voice box then plays one of a number of pre-recorded messages. When the door is subsequently closed, the approaching door frame resets the trigger so that the sentinel will emit another message when the door is next opened.

7 Claims, 4 Drawing Figures

FIG. 1
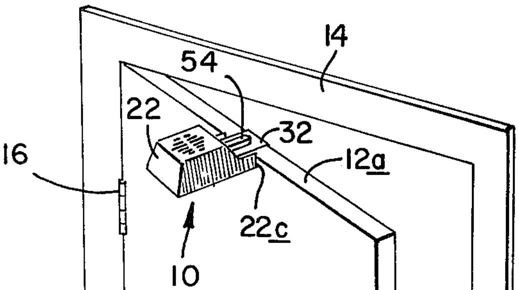
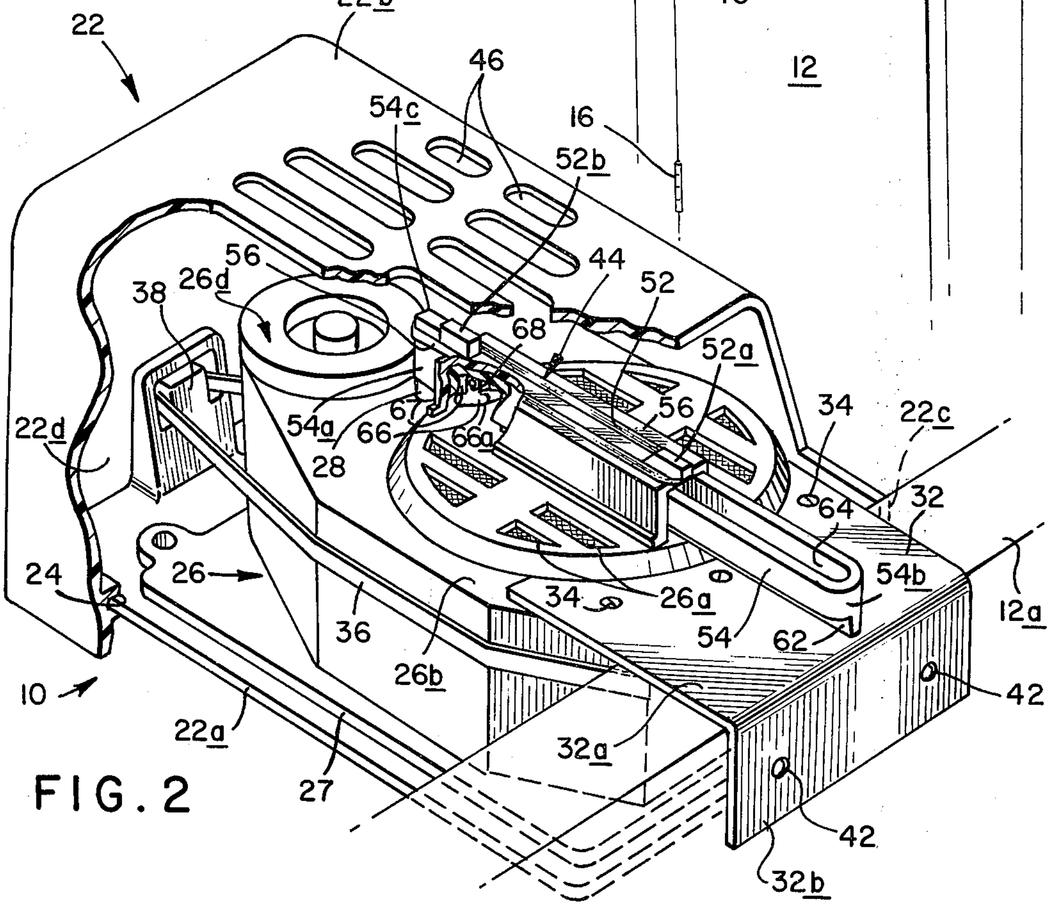
FIG. 2
FIG. 3
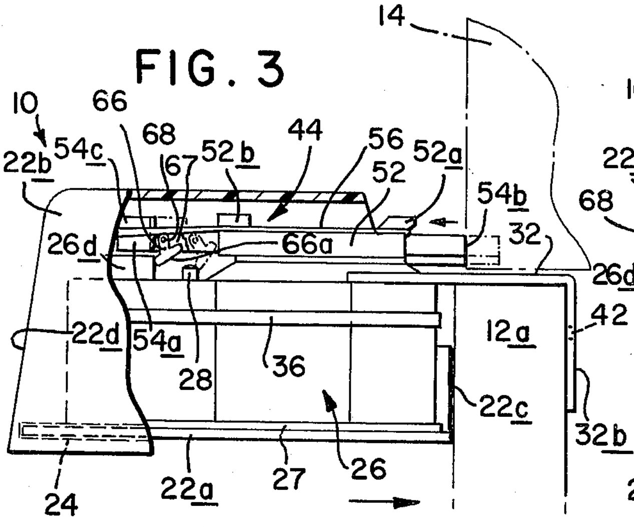
FIG. 4
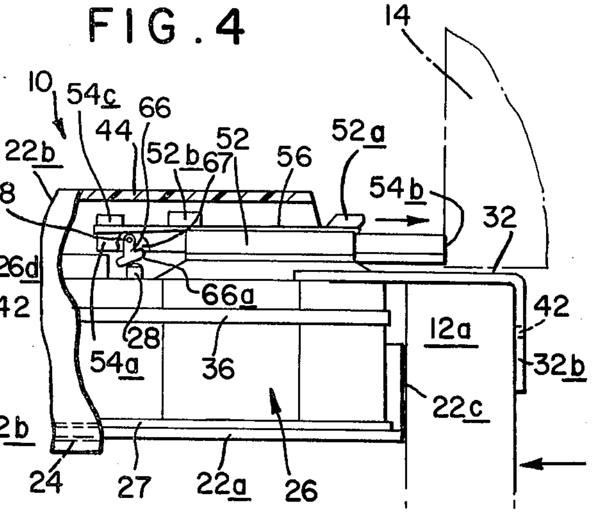

TALKING DOOR SENTINEL

BACKGROUND OF THE INVENTION

This invention relates to a sentinel which can be attached to a door, drawer, chest cover or the like which signals when the door or other closure is being opened. It relates more particularly to a sentinel of this type, which signals by emitting one of a plurality of pre-recorded audible messages or tunes.

There are numerous existing types of equipment which signal the opening or closing of a door. These range from bells suspended from the door by a spring which jingle when the door is moved to sophisticated electronic alarm systems triggered by switches responsive to door movement. Most of those devices are intended for use in stores, plants and the like to announce the arrival of a visitor, customer, or intruder.

Generally, however, they are not particularly suitable for use in the home. Some are too large and unsightly, others are much too expensive. None of them are designed, for example, to apprise a mother when a sleeping child has awakened and is leaving its room, or to signal when a child has gained access to a drawer, cabinet or other container which he is not supposed to open. Moreover, none of them have any particular merchandising appeal to the average person.

SUMMARY OF THE INVENTION

The present invention aims to provide a sentinel for mounting on a door, drawer or the like which signals when the door or other closure is being opened.

Another object of the invention is to provide a device of this type which is quite simple and inexpensive to make.

Yet another object of the invention is to provide a signalling device which should have excellent merchandising appeal.

Another object of the invention is to provide a sentinel which is easily installed by the average person.

A further object is to provide a unit of the type which can be installed on doors or closures of different sizes.

Still another object is to provide a signalling device of this type which should particularly appeal to children as a novelty item.

Other objects will in part be obvious and will in part appear hereinafter.

The invention accordingly comprises the features of construction, combination of elements and arrangement of parts which will be exemplified in the construction hereinafter set forth, and the scope of the invention will be indicated in the claims.

Generally, the sentinel comprises a housing which is attached to the edge of a door, drawer or the like by means of a bracket. The bracket, which is generally L-shaped, projects from the end of the housing and its short leg engages over the edge of the door. The short leg of the bracket and housing are biased toward one another with the edge of the door between them so that the signalling device is effectively clamped to the edge of the door.

The housing contains a conventional battery-operated voice box of the type used in talking dolls and toys. Basically, it is a miniature record player with a tone-arm carrying a needle which is acoustically coupled to a diaphragm. When a button, mounted in the wall of the voice box is depressed, a turntable carrying a miniature phonograph record rotates under the tone arm with the needle following the recording groove so that a brief audible message or song is emitted from the voice box. When the tone arm reaches the end of the record, the turntable is stopped automatically and the tone arm is reset to its start position in preparation for the next actuation of the voice box.

In the present device, the button which actuates the voice box, is depressed by a special trigger assembly which responds to the opening of the door to which the voice box is attached. The trigger assembly is mounted on the outside of the voice box housing. It comprises an elongated plunger which is slidably mounted on the outside of the voice box directly in line with its actuating button. The plunger slides in a direction perpendicular to the plane of the door to which the sentinel is attached.

The plunger can slide between an extended position in which one of its ends is positioned adjacent the far side of the door to which the device is attached and its other end is situated on one side of the actuating button of the voice box, to a retracted position in which said one end lies adjacent the near side of the door and its said other end is situated on the opposite side of the actuating button. Said other end of the plunger is fitted with a pivotally mounted pawl which is arranged to depress the actuating button of the voice box only when the plunger is moved to its extended position.

The plunger is biased toward its extended position so that it tends to remain there as long as the door to which the sentinel is attached is open. However, when the door is closed, the end of the plunger adjacent the door engages the door frame and continued closing of the door moves the plunger to its retracted position thereby resetting the trigger assembly. As long as the door remains closed, the plunger will not activate the voice box. However, as soon as the door is opened away from its frame, the plunger moves toward its extended position whereupon the pawl engages and depresses the actuating button of the voice box causing that unit to emit a pre-recorded message or tune.

Thus, each time the door is opened after being closed, the trigger assembly causes the voice box to go through one playing cycle, thereby apprising the parent that the door to which the device has been attached has been opened. Also, at the time the door is closed, the trigger assembly is reset so that it can initiate another voice box cycle when the door is next opened.

The present signalling device is relatively easy and inexpensive to make and it is easily mounted on the door, drawer or cover edge by the average homeowner, without any special tools or equipment. Moreover, its clamp-type securement to the door allows the device to be installed on doors of many different sizes without marking the woodwork and to be moved from one door to another easily at the whim of the user.

BRIEF DESCRIPTION OF THE DRAWING

For fuller understanding of the nature and objects of the invention reference should be had to the following detailed description taken in connection with the accompanying drawing, in which:

FIG. 1 is a fragmentary perspective view showing a sentinel made in accordance with this invention mounted on a standard door;

FIG. 2 is a perspective view on a much larger scale with parts broken away showing the sentinel in greater detail;

FIGS. 3 and 4 are views in a side elevation with parts broken away showing the operation of the trigger assembly of the FIG. 2 device in greater detail.

DESCRIPTION OF THE PREFERRED EMBODIMENT

Referring to FIG. 1, the sentinel indicated generally at 10 is installed on the upper edge 12a of a standard door 12. Door 12 is mounted in the usual frame 14 by way of hinges 16. Each time the door 12 is opened, the signalling device emits a pre-recorded message or tune which signals the fact that the door has been opened. The sentinel 10 can be mounted at almost any location around the edge of the door, other than on the hinged side thereof.

Turning now to FIG. 2, the sentinel 10 has a housing shown generally at 22 consisting of a flat, generally rectangular base section 22*a* and a shell-like cover section 22*b*. This section is open at its bottom and right-hand end as seen in FIG. 2.

Longitudinal channels 24 (only one of which is shown) extend along the bottom side edges of cover section 22*b*. The base section 22*a* is slid into these channels 24 through the open right hand ends thereof after which the housing is completely closed, except for its right-hand end.

A conventional voice box shown generally at 26 is contained in housing 22 with its usual flat base plate 27 secured to housing base section 22*a*. Voice box 26 can be the standard type of inexpensive battery-operated unit commonly found in many toys. Suffice it to say that when the voice box actuating button 28 is depressed, the voice box cycles through one playback operation so that a pre-recorded message or tune is audibly transmitted through the apertures 26*a* in the top wall 26*b* of the voice box. Most desirably, the voice box and record therein are of the type disclosed in U.S. Pat. No. 3,798,833 capable of playing in a random fashion different messages or tunes upon successive actuations of the voice box.

A generally L-shaped metal bracket 32 is secured to the top wall 26*b* of the voice box adjacent the end of cover section 22*b* by means of one or more screws 34. The long leg 32*a* of bracket 32 projects a considerable distance beyond the end of base plate 27 and its short leg 32*b* extends down parallel to the right-hand edges 22*c* (FIGS. 1 and 2) of the housing cover section 22*b*.

As best seen in FIGS. 3 and 4, in use, the sentinel 10 is mounted on door 12 so that bracket 32 overlies the edge 12*a* of the door, with its short leg 32*b* lying flush against the far side of the door and with the cover section edges 22*c* engaging the near face of the door. A stretched heavy rubber band 36 extends around the voice box 26 and also around a raised ear 38 formed in the closed left-hand wall 22*d* of the housing cover section. Thus, the voice box 26 (along with bracket 32) are biased toward the housing end wall 22*d*. This causes housing base section 22*a* to slide leftward as far as possible in its channels, thereby clamping the door edge 12a between bracket leg 32*b* and cover section edges 22*c* (and the edge of base section 22*a*). One or more openings 42 (FIG. 2) are provided in bracket leg 32*b* for accommodating tacks to semi-permanently anchor the bracket to the door, should that be deemed desirable. With this arrangement, then, the unit can be installed on doors of different thicknesses, with the rubber band 36 stretching as necessary to accommodate the spacing between the edges 22*c* and bracket leg 32*b*.

Referring now to FIGS. 2 to 4, a trigger assembly shown generally at 44 is mounted on the top wall 26*b* of the voice box in line with its actuating button 28. The trigger assembly 44 operates to depress the button 28 whenever door 12 is opened so that a pre-recorded message is transmitted through the apertures 26*a* in the voice box and through overlying apertures 46 (FIG. 2) in the top wall of housing section 22*b*.

The trigger assembly 44 includes a channel 52 secured to the top face 26*b* of the voice box. The channel extends from a point adjacent actuating button 28 almost to the right hand end of the voice box 26. As best seen in FIG. 2, it is oriented perpendicular to the plane of bracket leg 32*b*. An elongated plunger 54 is slidably mounted in channel 52. The plunger is movable between an extended position, shown in FIG. 2 which places its left-hand end 54*a* to the right of button 28 just inside channel 52 and its right-hand end 54*b* near the bracket leg 32*b* and a retracted position shown in FIG. 3 in which its left-hand end 54*a* is displaced further to the left of leg 32*b*. The plunger is biased to its extended position by means of a heavy rubber band 56 stretched between a raised pedestal 54*c* at the left-hand end of the plunger and a raised ear 52*a* formed in the top right-hand end of channel 52. The movement of the plunger 54 to the right is limited by the engagement of the pedestal 54*c* with a raised abutment 52*b* formed at the left-hand end of channel 52. The bottom portion of the plunger 54 is narrowed, leaving only a rib 62 to minimize the sliding friction between the plunger and the portion of box top wall 26*b* under the channel. Also, a long slot 64 is formed in the top of plunger 54 to accommodate the underside of ear 52*a* as the plunger slides between its two positions.

As best seen in FIGS. 3 and 4, a pawl 66 is pivotally mounted at the left-hand plunger end 54*a*.

The pawl 66 is generally rectangular, although its lower edge 66*a* is beveled so that it ramps downwards from right to left as viewed in these FIGS. The pawl is situated in a vertical slot 67 extending through plunger 54. It is held there by a pin 68 extending through the pawl and secured in plunger 54 at the opposite sides of the slot 67. It tends to hang down vertically as shown in the solid lines in FIG. 3. The pawl is free to cock counterclockwise to a limited extent. However, as shown in FIG. 3, it is prevented from swinging clockwise from its vertical position by engagement of the pawl with the underside of abutment 54*c*. Accordingly, as shown in FIG. 4, as plunger 54 moves toward its extended position, the pawl is drawn opposite button 28 so that its beveled surface 66*a* wedges down against the rounded top of the button, thereby depressing the button and actuating the voice box 26. On the other hand, when the plunger 54 is moved to the left from its FIG. 2 position to its retracted position of FIG. 3, the pawl 66 can swing up out of the way of button 28 as indicated in dotted lines in that figure and than drop down into the space between the button and boss 26*d* on the top of voice box 26 as shown in solid lines.

Assume now that the sentinel has just been installed on door 12. When the door is first closed, the plunger 54 engages the door frame 14 and is moved to its retracted position shown in FIG. 3. If the door is now opened, the plunger is urged toward its extended position by rubber band 56. The pawl 66 swings clockwise slightly and wedges down on button 28 (FIG. 4), on the way by the button, thereby actuating the voice box, which thereupon goes through a playback cycle. The trigger assembly will not be reset until the door is again closed so that the door frame 14 moves the plunger 54 to its retracted position. In that event, the pawl 66 will ride up and over button 28 as in FIG. 3, and occupy its original position adjacent to boss 26d.

As seen from the foregoing, the subject sentinel is very easy and inexpensive to make, since most of its components are molded of an inexpensive plastic such as styrene. The unit is easily attached to the door without any special tools or equipment. Furthermore, it accommodates itself to doors of different thicknesses since the cover section 26b is slidable relative to section 26*a* and the bracket 32. Accordingly, plunger 54 is always properly positioned relative to the door edge so that when the door is closed, the plunger is moved by frame 14 enough to cause pawl 66 to depress button 28.

The present signaling device has considerable novelty appeal, particularly if it has the multi-track random play capability described in the aforesaid patent. The messages emitted by the voice box are designed for particular situations of use. If one is most interested in knowing when a child leaves a room, the recorded message might be one directing the child to stay in the room and close the door. On the other hand, if the signaling device is intended primarily for use by a child, i.e. on his bedroom door, the recorded messages can be funny statements or songs that would particularly appeal to children.

It should also be understood that while we have described the sentinel as being activated when a door is opened, it can also be designed to signal when a door is closed. This simply involves shortening the channel 52 somewhat and relocating the pawl 66 on the plunger 54 and turning it around so that it wedges down the button 28 when the plunger is moved to its retracted position. Also, the subject device can be installed on other closure members, such as drawers, cabinets, boxes, etc. to signal the opening or closing of those containers. This simply involves the proper shaping and dimensioning of the bracket 32. For example, in the case of a drawer, the short leg 32*b* of the bracket would be stepped so that it could fit between the drawer and the drawer frame.

It will thus be seen from the foregoing that the objects set forth above, among those made apparent from the preceding description, are efficiently attained and, since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

I claim:

1. A sentinel for signalling the opening and closing of a closure member relative to a frame therefor comprising:

A. a housing;

B. a battery operated voice box in the housing of the type having an exposed button which causes the box to cycle through one playback operation when the button is depressed momentarily and to cycle repetitively as long as the button is depressed;

C. means for mounting the housing near an edge of the member;

D. a trigger mounted adjacent the voice box button, said trigger 1. being movable between the first and second positions;
2. having one portion which engages the frame when the member is closed so as to move the trigger to its first position; and
3. having another portion which engages and momentarily depresses the voice box button when the trigger is moved to one of its two positions so that the box cycles through only one playback operation and emits an audible message at the vicinity of the closure member;

E. means for resetting the trigger when the member is moved to its other position so that the box will cycle through another playback operation when the member is moved again to its said one position.

2. The door sentinel defined in claim 1 further including means for biasing said trigger to its second position.

3. The door sentinel defined in claim 1 wherein said mounting means comprise:

A. a bracket mounted on the voice box and projecting from the housing for engaging over an edge of said member; and B. means for drawing the bracket and housing toward one another so that the member edge is clamped between them.

4. A sentinel for signalling the opening or closing of a closure member in a frame therefore comprising A. a battery-operated voice box, having an exposed actuating button;

B. means for securing the voice box to the edge of the closure member;

C. a trigger assembly mounted on the voice box, said trigger assembly including 1. an elongated plunger slidably mounted on the voice box in line with the actuating button and arranged to slide along an imaginary line extending between the button and the closure member, said plunger being movable between an extended position wherein its one end overlies the actuating button and its other end overlies the closure member to a second position wherein both ends of the plunger are shifted relative to the actuating button and the edge of the closure member;
2. means for biasing the plunger to its extended position; and
3. means at the one end of the plunger for engaging and actuating the button when the plunger is moved to one of its two positions by the relative movement between the plunger and the edge.

5. A sentinel as defined in claim 4 wherein the engaging means comprise a pawl on the plunger.

6. A sentinel as defined in claim 5 wherein the pawl has a bevelled edge facing the actuating button and also includes a pivotal connection between the pawl and the plunger so that the pawl can swing about its pivot to a limited extent when the plunger is moved to its retracted position.

7. The sentinel defined in claim 4 and further including:

A. a cover overlying the trigger assembly and voice box, said cover being slidably connected to the voice box so that it can move in a direction parallel to the longitudinal axis of the plunger, and means defining an opening in the side wall of the cover adjacent to the bracket, said bracket projecting through the opening; and C. means for retracting the bracket into the opening so that when the bracket is engaged over the edge of the closure member, that member is clamped between the bracket and the cover.

* * * * *